United States Patent

[11] 3,565,388

| [72] | Inventor | Wolfgang Katz |
| | | 722 Dauchingen, Germany |
| [21] | Appl. No. | 760,794 |
| [22] | Filed | Sept. 19, 1968 |
| [45] | Patented | Feb. 23, 1971 |
| [32] | Priority | Sept. 23, 1967 |
| [33] | | Germany |
| [31] | | P 17 04 150.8 |

[54] APPARATUS FOR THE PRODUCTION OF PLASTIC CAGES FOR ANTIFRICTION BEARINGS
9 Claims, 2 Drawing Figs.

[52] U.S. Cl. .................................................. 249/63, 18/42
[51] Int. Cl. ...................................................... B29c 1/14, B29c 7/00, B29c 11/00
[50] Field of Search ............................................. 249/63, 64, 68, 160; 18/42, 42 (D), 42 (I), 42 (R), 42 (M), (Camming), (TT)

[56] References Cited
UNITED STATES PATENTS
| 2,929,105 | 3/1960 | Starck et al. .................. | 18/42 |
| 3,060,509 | 10/1962 | McCubbins .................. | 18/42 |

Primary Examiner—Charles W. Lanham
Assistant Examiner—Lucius R. Frye
Attorney—Michael S. Striker ABSTRACT: Apparatus for injection molding of elastically deformable plastic cages which are formed with sockets for rolling elements of antifriction bearings comprises a stationary outer cylindrical mold section and an inner mold section movable into the outer mold section to define therewith a cylindrical mold cavity. Radial mandrels are mounted in the outer mold section and have spherical portions which enter the mold cavity in response to movement of the inner mold section into the outer mold section. The means for shifting the mandrels radially of the outer mold section comprises arms which are movable with the inner mold section and enter cam grooves provided in the adjoining mandrels.

APPARATUS FOR THE PRODUCTION OF PLASTIC CAGES FOR ANTIFRICTION BEARINGS

BACKGROUND OF THE INVENTION

The present invention relates to injection-molding apparatus in general, and more particularly to an apparatus which can be utilized for the production of plastic cages for rolling elements of antifriction bearings. Still more particularly, the invention relates to an apparatus for automatic or semiautomatic production of one-piece plastic cages of cylindrical or annular shape which are provided with sockets or recesses for reception of preferably spherical rolling elements.

SUMMARY OF THE INVENTION

It is an object of my invention to provide a relatively simple injection-molding apparatus wherein the sockets for rolling elements are formed in the body of the cage in automatic response to admission of plasticized material into the mold cavity.

Another object of the invention is to provide an injection-molding apparatus wherein one or more sets of mandrels which cause the formation of sockets in the cage are moved in automatic response to opening or closing of the apparatus and wherein such mandrels can perform at least one additional useful function.

The improved injection-molding apparatus is utilized for the production of plastic cages which preferably consist of elastomeric material and have sockets for preferably spherical rolling elements of antifriction bearings. The apparatus comprises first and second supports one of which is movable toward and away from the other support, an annular outer mold section provided on the first support, and inner mold section carried by the second support and defining with the outer mold section an annular mold cavity in response to movement of the one section toward the other section, at least one group of mandrels movable substantially radially through openings provided therefor in the outer mold section and having preferably spherical portions configurated to define sockets in the plastic material which is injected into the cavity upon completed movement of the one support toward the other support, and shifting means operatively connected with the second support and arranged to move the mandrels radially inwardly so as to locate their portions in the cavity in response to movement of the one support toward the other support, and to move the mandrels radially outwardly so as to extract their portions from the cage in the cavity in response to movement of the one support away from the other support.

The novel features which are considered as characteristic of the invention are set forth in particular in the appended claims. The improved injection-molding apparatus itself, however, both as to its construction and its mode of operation, together with additional features and advantages thereof, will be best understood upon perusal of the following detailed description of a specific embodiment with reference to the accompanying drawing.

DESCRIPTION OF THE PREFERRED EMBODIMENT

Figure 1:
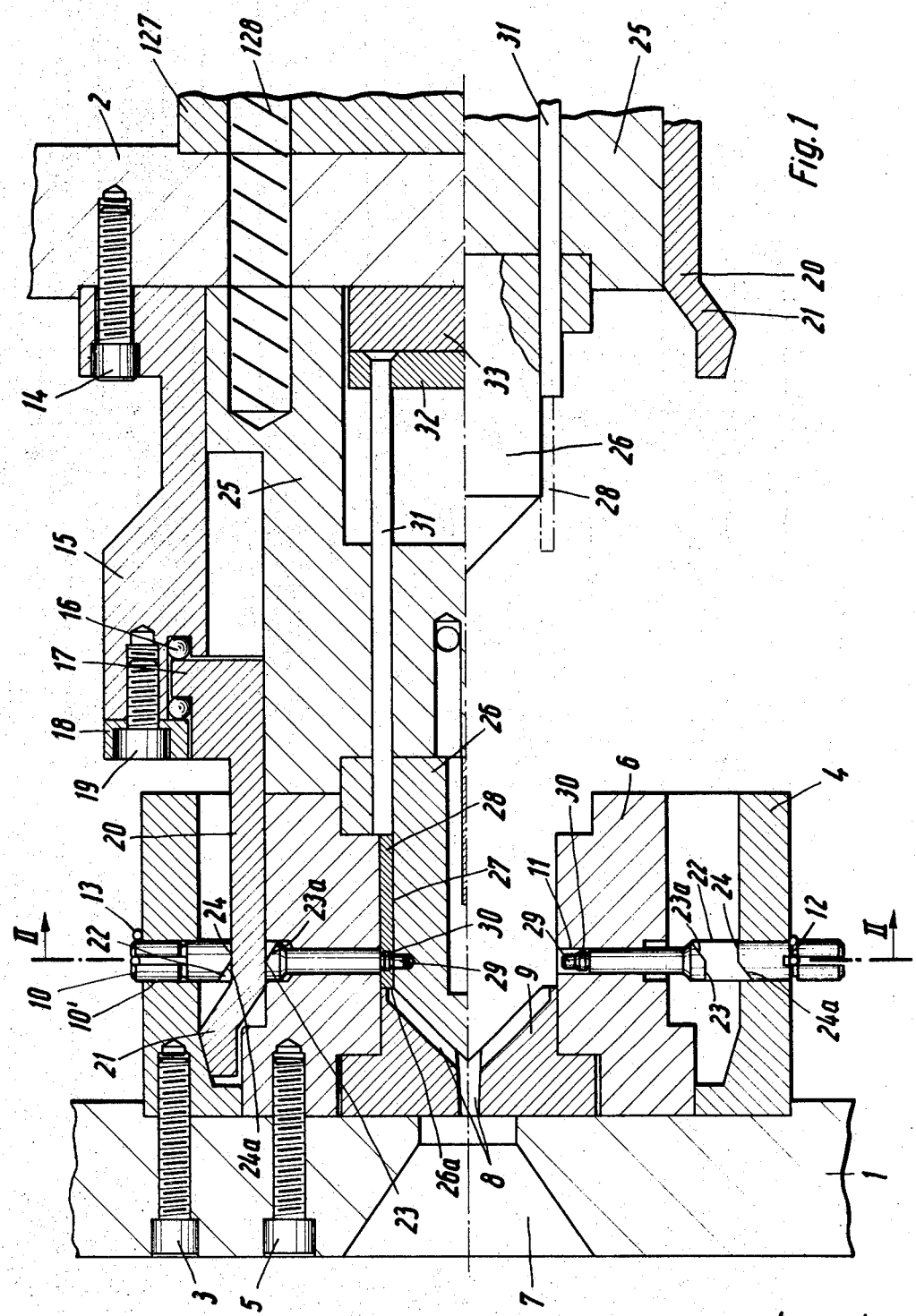
FIG. 1 is a fragmentary axial sectional view of an injection-molding apparatus which embodies the invention, the movable parts of the apparatus being shown in closed position in the upper half and in open position in the lower half on the illustration.
Figure 2:
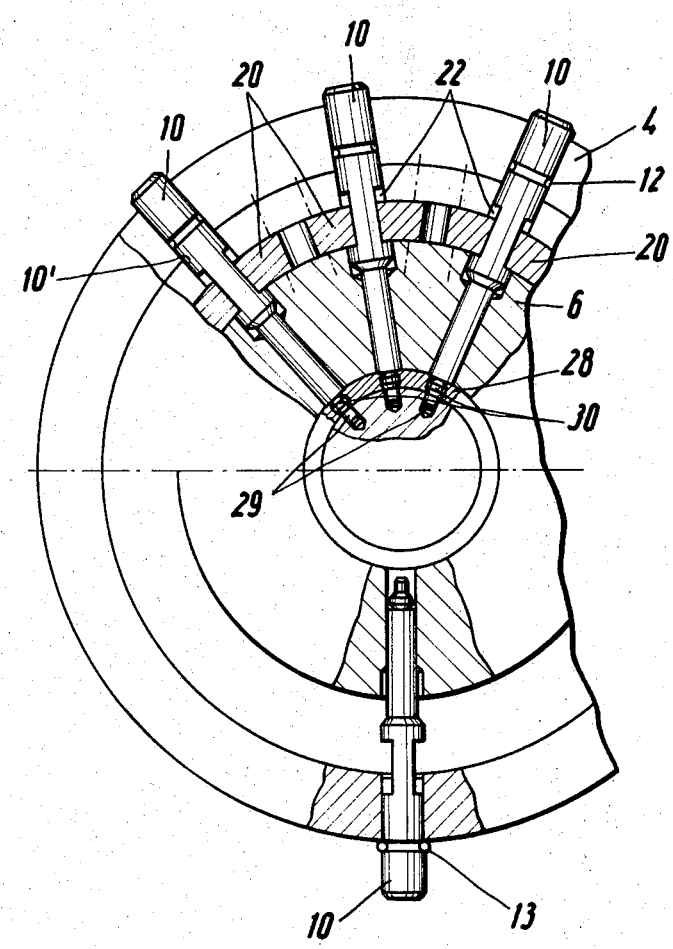
FIG. 2 is a fragmentary transverse vertical sectional view as seen in the direction of arrows from the line II—II of FIG. 1.

The injection-molding apparatus of FIGS. 1 and 2 comprises a stationary support or platen and a second support or platen 2 which is parallel to and is movable toward and away from the stationary platen 1. The latter supports a ring-shaped guide 4 which is secured thereto by bolts 3 or analogous fasteners and a cylindrical outer mold section 6 which is secured to the platen 1 by fasteners 5. The platen 1 is formed with a centrally located orifice 7 for admission of plasticized material into channels 8 which communicate with the mold cavity 27. The channels 8 are formed in a gate 9 which can be said to form part of the platen 1.

The ring-shaped guide 4 is formed with radial openings or bores 10' which accommodate the outer portions of radially reciprocable mandrels 10 serving to provide the cage with recesses or sockets for balls, not shown. The mandrels 10 extend radially inwardly into registering radial openings or bores 11 provided in the inner mold section 6 and the outer end portion of each mandrel is provided with a circumferential groove 12 which can receive a retaining ring 13 of wire or like material when the mandrel assumes its outer end position as shown in the lower part of FIG. 1. The rings 13 serve to yieldably hold the mandrels 10 in such outer end positions.

The movable second platen 2 supports a sleevelike carrier 15 which is secured thereto by bolts 14. The carrier supports a rakelike annular shifting member 17 which is mounted therein on antifriction bearings 16 and is held against axial movement by a ring-shaped retainer 18 secured to the carrier by bolts 19. The shifting member 17 is formed with parallel motion-transmitting prongs or arms 20 which extend toward the platen 1 but are slightly inclined with reference to the axis of the carrier 15. The front end portions of the arms 20 have outwardly extending tips or heads 21 bounded by flat surfaces. Each mandrel 10 extends radially inwardly between two adjoining arms 20 and each such mandrel is formed with a circumferential cam groove 22 into which the adjoining arms 20 extend to effect axial movement of mandrels 10 radially of the mold section 6 in response to movement of the shifting member 17 toward or away from the stationary platen 1. The grooves 22 are flanked by pairs of faces or shoulders 23 and 24 extending at right angles to the axes of such mandrels and being respectively nearer to the platens 1 and 2. Since each arm 20 cooperates with two adjoining mandrels 10, the parts 10, 17, 20, 21 together occupy very little room in the apparatus.

When the platen 2 is moved away from the platen 1, the heads 21 of the arms 20 engage the inclined faces 24a of the mandrels 10 and cause the mandrels to move radially outwardly, i.e., toward the outer end positions such as the one assumed by the lower mandrel 10 of FIG. 1. When the platen 2 moves toward the platen 1, the heads 21 engage the faces 23a of the mandrels 10 and cause them to move radially inwardly toward the inner end positions corresponding to that of the mandrel shown in the upper part of FIG. 1.

\* Simultaneously the inner end portions 29 of the mandrels 10 enter recesses provided therefor in the external surface of the mold section 26.

The movable platen 2 further supports a reciprocable holder 25 for an inner mold section 26 which can be introduced axially into the outer mold section to define therewith the mold cavity 27. The platen 2 further carries a retainer 127 for springs 128 which extend into pockets provided in the holder 25 and serve to bias the holder away from the platen 2, i.e., toward the platen 1. When the injection mold is closed (as shown in the upper half of FIG. 1), the holder 25 bears against the outer mold section 6 and the springs 128 store energy. When the platen 2 is being moved away from the platen 1 to open the mold, the platen 2 entrains the shifting member 17 whereby the arms 21 of the shifting member move the mandrels 10 radially outwardly. During the initial stage of movement of the platen 2 away from the platen 1, the springs 128 continue to maintain the holder 25 in abutment with the outer mold section 6. The holder 25 begins to move away from the mold section 6 when the mandrels 10 already assume their outer end positions. The holder 25 entrains the inner mold section 26. The extent to which the holder 25 is reciprocable with reference to the carrier 15 and platen 2 is determined by the shifting member 17. The situation is analogous when the platen 2 is moved toward the platen 1 to close the mold and to stress the springs 128. During the first stage of such movement, the arms 21 of the shifting member 17 cause the mandrels 10 to move radially inwardly and the inner mold section 26 enters the outer mold section when the mandrels 10 almost assume their inner end positions.

The mold cavity 27 is defined by the external surface of the inner mold section 26 and the internal surface of the outer mold section 6. This cavity 27 communicates with the aforementioned channels 8 in the gate 9. When the mold 6, 26 is closed, the inner end portions 29 of the mandrels 10 extend radially across the mold cavity 27 and into blind bores or recesses provided therefor in the external surface of the mold section 26 so that the latter is thereby locked in operative or closing position. Those portions 30 of the mandrels 10 which extend across the mold cavity 27 resemble parts of spheres which are flattened adjacent to the internal surface of mold section 6 and to the external surface of mold section 26. The finished cage is shown at 28. When the material of this cage sets, the platen 2 is moved away from the platen 1 to move the mold section 26 away from the mold section 6 and to move the mandrels 10 radially outwardly. The mold section 26 is formed with an entraining shoulder 26a at the left-hand end of the cavity 27 and such shoulder causes the cage 28 to move with the section 26 when the latter is extracted from the outer mold section 6. The material of the cage 28 is at least slightly elastic so that the spherical portions 30 of the mandrels 10 can be readily extracted from the cage in response to movement of heads 21 away from the platen 1. The spherical portions 30 then leave in the cage 28 concave sockets which are open at the inner and outer sides of the cage and are ready to receive the balls or analogous antifriction rolling elements. The means for forcibly introducing balls into such sockets can be constructed in a manner as disclosed in my copending application Ser. No. 760,795 entitled "Apparatus for introducing rolling elements into cages of antifriction bearings."

The holder 25 for the inner mold section 26 further supports axially parallel ejector pins or knockout pins 31 which can be moved axially with an ejector plate 32 which is shiftable axially by an ejector bar 33. When the mold is open, the bar 33 is moved with reference to the holder 25 in the direction toward the platen 1 whereby the pins 31 separate the freshly formed cage 28 from the external surface of the inner mold section 26. The apparatus is then ready for the next operation, i.e., the injection of a fresh batch of plasticized material can begin as soon as the movable parts return to the positions shown in the upper half of FIG. 1. The holder 25 is movable toward the platen 2 when the mold 6, 26 is open to thereby compress the springs 128. All steps in the formation and ejection of cages 28 can be carried out in rapid sequence and automatically with the help of a suitable programming system, not shown.

The mandrels 10 may be located in a common plane which is normal to the axis of the mold section 6. It is also possible and presently preferable to employ a helical array of mandrels; such helical array may have a very small lead of about 3° with reference to the axis of the apparatus. The inclination of arms 20 on the shifting member 17 depends on the lead of such helix and a helical distribution of mandrels 10 necessitates the provision of a shifting member 20 which is rotatable with reference to its carrier 15, i.e., with reference to the movable platen 2. The carrier 15, guide 4 and mold section 6 can form integral parts of the respective platens.

If desired, the guide 4 can carry two or more sets of mandrels 10 so that the cage 28 may be formed with several sets of cavities. The arms 20 can actuate one set of mandrels and the remaining sets of mandrels can derive motion from the mandrels of the one set. The cam grooves 22 are located between the guide 4 and the outer mold section 6.

I claim:

1. Injection-molding apparatus for the production of plastic cages having sockets for rolling elements of antifriction bearings, comprising a first support; a second support, one of said supports being movable toward and away from the other support; an annular outer mold section on said first support; an inner mold section carried by said second support and defining with said outer section an annular mold cavity on movement of said one support toward other said support; at least one group of mandrels movable substantially radially through the openings provided in said outer section and having portions configured to define sockets in plastic material which is injected into said cavity; guide means carried by said first support and surrounding said outer mold section, said guide means having openings registering with the openings of said outer mold section and said mandrels having outer portions reciprocably received in the openings of said guide means; and shifting means operatively connected with said second support and arranged to move the mandrels inwardly so as to locate said portions in the cavity in response to movement of said one support toward said other support, and to move the mandrels outwardly so as to extract said portions from the cage in said cavity in response to movement of said one support away from said other support.

2. Apparatus as defined in claim 1, wherein said shifting means comprises arms extending in the general direction toward said first support and engaging with said mandrels in response to movement of said one support with reference to said other support to thereby effect radial movement of said mandrels, said mandrels having cam grooves located between said guide means and said outer mold section and receiving portions of said arms at least while said one support moves toward said other support.

3. Injection-molding apparatus for the production of plastic cages having sockets for rolling elements of antifriction bearings, comprising a first support; a second support, one of said supports being movable toward and away from the other support; an annular outer mold section on said first support; an inner mold section carried by said second support and defining with said outer section an annular mold cavity on movement of said one support toward said other support; at least one group of mandrels movable substantially radially through openings provided in said outer section and having portions configured to define sockets in plastic material which is injected into said cavity, said mandrels forming a helical array; and shifting means operatively connected with said second support and arranged to move the mandrels inwardly so as to locate said portions in the cavity in response to movement of said one support toward said other support, and to move the mandrels outwardly so as to extract said portions from the cage in said cavity in response to movement of said one support away from said other support.

4. Apparatus as defined in claim 1, wherein said mandrels have inner end portions which extend into recesses provided therefor in said inner mold section upon completed movement of said one support toward said other support.

5. Apparatus as defined in claim 1, wherein each of said mandrels has a cam groove outwardly adjacent to said outer mold section and wherein said shifting means comprises arms each of which extends into the cam grooves of two adjoining mandrels, at least while said one support moves toward said other support.

6. Apparatus as defined in claim 1, further comprising resilient means for biasing said inner mold section away from said second support and toward said first support, said resilient means storing energy in response to movement of said one support toward said other support and being arranged to maintain said inner mold section in the interior of said outer mold section during the first stage of movement of said one support away from said other support.

7. Apparatus as defined in claim 6, further comprising holder means rigid with said inner mold section and movable with reference to said second support axially of said outer mold section toward and away from said first support, said resilient means operating between said second support and said holder means.

8. Apparatus as claimed in claim 7, wherein said holder means is movable away from said first support upon completed movement of said one support away from said other support to thereby stress said resilient means.

9. Apparatus as defined in claim 3, wherein said shifting means is rotatable with reference to said second support about the common axis of said mold sections.